(12) United States Patent
Huang et al.

(10) Patent No.: US 11,345,786 B2
(45) Date of Patent: May 31, 2022

(54) LIQUID BICONTINUOUS STABILIZED ASSEMBLIES BY INTERFACIAL JAMMING OF NANOPARTICLES

(71) Applicants: THE UNIVERSITY OF MASSACHUSETTS, Boston, MA (US); The Regents of the University of California, Oakland, CA (US)

(72) Inventors: Caili Huang, Oak Ridge, TN (US); Joseph William Forth, Ilkley (GB); Brett Anthony Helms, Oakland, CA (US); Thomas P. Russell, Amherst, MA (US)

(73) Assignees: THE UNIVERSITY OF MASSACHUSETTS, Boston, MA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 410 days.

(21) Appl. No.: 16/428,536

(22) Filed: May 31, 2019

(65) Prior Publication Data

US 2019/0375898 A1    Dec. 12, 2019

Related U.S. Application Data

(60) Provisional application No. 62/683,753, filed on Jun. 12, 2018.

(51) Int. Cl.
   *C08J 3/11*   (2006.01)
   *C08J 3/20*   (2006.01)
   (Continued)

(52) U.S. Cl.
   CPC ............ *C08J 3/11* (2013.01); *B01F 23/4105* (2022.01); *B01F 25/10* (2022.01); *C08J 3/203* (2013.01);
   (Continued)

(58) Field of Classification Search
   CPC .......................................................... C08J 3/11
   See application file for complete search history.

(56) References Cited

U.S. PATENT DOCUMENTS 8,202,614 B2    6/2012    Koene et al.
2004/0202682 A1  10/2004    Emrick et al.
(Continued)

FOREIGN PATENT DOCUMENTS

CN         101481444 A    7/2009

OTHER PUBLICATIONS

Binks, Bernard P., et al., "Colloidal Particles at Liquid Interfaces" (Cambridge Univ. Press, 2008).
(Continued)

*Primary Examiner* — Michael F Pepitone
(74) *Attorney, Agent, or Firm* — Cantor Colburn LLP

(57) ABSTRACT

A method for preparing a stabilized assembly includes combining a first liquid phase including nanoparticles and a second, immiscible liquid phase, dissolving in the second phase a first end-functionalized polymer having a first molecular weight, and a second end-functionalized polymer having a second molecular weight, wherein the second molecular weight is greater than the first molecular weight, applying a shearing external deformation field to increase the surface area of the first phase to create a new interface, wherein the nanoparticle surfactants form a disordered, jammed assembly at the new interface, and releasing the shearing external deformation field. The polymer and the nanoparticles can interact at an interface through ligand interactions to form nanoparticle surfactants and upon releasing the external deformation field the jammed assembly at the new interface traps the first phase in a deformed state having the first liquid phase and the second liquid phase as interpenetrating domains.

16 Claims, 4 Drawing Sheets

(51) Int. Cl.
| | |
|---|---|
| C08L 25/06 | (2006.01) |
| C08L 83/08 | (2006.01) |
| B01F 23/41 | (2022.01) |
| B01F 25/10 | (2022.01) |

(52) U.S. Cl.
CPC .............. *C08L 25/06* (2013.01); *C08L 83/08* (2013.01); *B01F 23/4146* (2022.01); *C08J 2325/06* (2013.01); *C08J 2383/08* (2013.01); *C08J 2425/06* (2013.01); *C08J 2483/08* (2013.01)

(56) References Cited

U.S. PATENT DOCUMENTS

2015/0102265 A1* 4/2015 Russell ............... B01F 17/0028
252/500
2015/0105347 A1 4/2015 Spicer et al.

OTHER PUBLICATIONS

Brown, E. et al., "Universal Robotic Gripper Based on the Jamming of Granular Material", (2010), vol. 107, 44, pp. 18809-18814.
Cates, M. et al., "Bijels: A New Class of Soft Materials", (2008), Soft Matter, 4, pp. 2132-2138.
Clegg, Paul S., "Emulsification of partially miscible liquids using colloidal particles: nonspherical and extended domain structures", Langmuir 23, 5984-5994 (2007).
Cui, M. et al., "Stabilizing Liquid Drops in Nonequilibrium Shapes by the Interfacial Jamming of Nanoparticles", (2013) Science 342, pp. 460-463 & Supp. Materials, (2013); 11 pp. total.
Dinsmore, A. D. et al., "Colloidosomes: Selectively Permeable Capsules Composed of Colloidal Particles", (2002), Science 298, pp. 1006-1009.
Du, K. et al., "Three-Dimensional Real-Time Tracking of Nanoparticles at an Oil-Water Interface," Langmuir; Jun. 5, 2012, pp. 9181-9188, vol. 28.
Feng, J. et al., "A Computational Analysis of Electrohydrodynamics of a Leaky Dielectric Drop in an Electric Field", (1995), J. Fluid Mech., vol. 311, pp. 289-326.
Forth, J. et al., "Using a molecular stopwatch to study particle uptake in Pickering emulsions", Langmuir 32, 6387-6397 (2016).
Ha, J. W. et al., "Deformation and Breakup of Newtonian and Non-Newtonian Conducting Drops in an Electric Field", (1999), J. Fluid Mech., vol. 405, pp. 131-156.
Haase Martin F., et al., "In situ mechanical testing of nanostructured bijel fibers", ACS Nano 10, 6338-6344 (2016).
Haase, Martin F., et al., "Continuous fabrication of hierarchical and asymmetric bijel microparticles, fibers, and membranes by solvent transferinduced phase separation (STRIPS)", Adv. Mater. 27, 7065-7071 (2015).
Herzig, E. M. et al., "Bicontinuous Emulsions Stabilized Solely by Colloidal Particles", (2007), Nature Materials, vol. 6, pp. 966-977.
Hijnen Niek, et al., "Bijels stabilized using rod-like particles", Soft Matter 11, 4351-4355 (2015).
Huang Caili, et al., "Structured liquids with pH-triggered reconfigurability", Adv. Mater. 28, 6612-6618 (2016).
Huang, Caili et al., "Bicontinuous structured liquids with submicrometre domains using nanoparticle surfactants", Nature Nanotechnology, vol. 12, Nov. 2017.
Jansen, Fabian et al., "From bijels to Pickering emulsions: a lattice Boltzmann study", Phys. Rev. E 83, 1-11 (2011).
Kralchevsky, P.A., et al., "On the thermodynamics of particle-stabilized emulsions: curvature effects and catastrophic phase inversion", Langmuir 21, 50-63 (2005).
Lee, Matthew N., et al., "Bicontinuous macroporous materials from bijel templates", Adv. Mater. 22, 4836-4841 (2010).
Lee, Matthew N., et al., "Making a robust interfacial scaffold: bijel rheology and its link to processability" Adv. Funct. Mater. 23, 417-423 (2013).
Lin, Y. et al, "Nanoparticle Assembly and Transport at Liquid-Liquid Interfaces", (2003), Science, 299, pp. 226-229.
Pawar, A. et al., "Arrested Coalescence in Pickering Emulsions", (2011), The Royal Society of Chemistry, Soft Matter, 7, 7710, pp. 7710-7716.
Reeves, M., et al., "Particle-size effects in the formation of bicontinuous Pickering emulsions", Phys. Rev. E 92, 032308 (2015).
Rumble, Katherine A. et al., "Compressing a spinodal surface at fixed area: bijels in a centrifuge", Soft Matter 12, 4375-4383 (2016).
Saville, D., "Electrohydrodynamics: The Taylor-Melcher Leaky Dielectric Model", (1997), J. Fluid Mech., 29, pp. 27-64.
Stone, H. A. et al., "Drops with Conical Ends in Electric and Magnetic Fields", (1999), Proceedings: Mathematical, Physical and Engineering Sciences, vol. 455, No. 1981, pp. 329-347.
Stratford, K. et al., "Colloidal Jamming at Interfaces: A Route to Fluid-Bicontinuous Gels", (2005), Science 309, pp. 2198-2201.
Subramaniam, A. et al., "Mechanics of Interfacial Composite Materials", (2006), Langmuir, 22, pp. 10204-10208.
Subramaniam, A. et al., "Non-Spherical Bubbles", (2005), Nature, vol. 438, p. 930.
Tavacoli Joe W. et al., "Novel, robust, and versatile bijels of nitromethane, ethanediol, and colloidal silica: capsules, subtenmicrometer domains, and mechanical properties", Adv. Funct. Mater. 21, 2020-2027 (2011).
Taylor, G., "Disintegration of Water Drops in an Electric Field", (1964), Proceedings of the Royal Society of London, Series A, Mathematical and Physical Sciences, vol. 280, 1382, pp. 383-397.
Vizika, O. et al., "The Electrohydrodynamic Deformation of Drops Suspended in Liquids in Steady and Oscillatory Electric Fields", (1991), J. Fluid Mech., vol. 239, pp. 1-21.
Wi, Haeng Sub, et al., "Nanoparticle adsorption at liquid-vapor surfaces: influence of nanoparticle thermodynamics, wettability, and line tensio", Langmuir 27, 9979-9984 (2011).
Zhang, J. et al., "One-Step Fabrication of Supramolecular Microcapsules from Microfluidic Droplets", (2012), Science 335, pp. 690-694.

\* cited by examiner

LIQUID BICONTINUOUS STABILIZED ASSEMBLIES BY INTERFACIAL JAMMING OF NANOPARTICLES

CROSS-REFERENCE TO RELATED APPLICATIONS

This application claims the benefit of U.S. Provisional Application No. 62/683,753, filed Jun. 12, 2018, which is incorporated by reference herein in its entirety.

STATEMENT REGARDING FEDERALLY SPONSORED RESEARCH & DEVELOPMENT

This invention was made with government support under Contract No. DE-AC02-05CH11231, awarded by the Department of Energy, Office of Science, Office of Basic Energy Sciences, Materials Sciences and Engineering Division, within the Adaptive Interfacial Assemblies Towards Structuring Liquids program (KCTR16). The government has certain rights in the invention.

BACKGROUND

In response to a change in temperature or chemical composition, certain liquids de-mix by spinodal decomposition, forming two continuous, interconnected domains with a single characteristic length scale. See, e.g., Hijnen, N., Cai, D. & Clegg, P. S. Bijels stabilized using rod-like particles, Soft Matter 11, 4351-4355 (2015); Haase, M. F., Stebe, K. J. & Lee, D. Continuous fabrication of hierarchical and asymmetric bijel microparticles, fibers, and membranes by solvent transferinduced phase separation (STRIPS), Adv. Mater. 27, 7065-7071 (2015); Haase, M. F., Sharifi-Mood, N., Lee, D. & Stebe, K. J. In situ mechanical testing of nanostructured bijel fibers, ACS Nano 10, 6338-6344 (2016). If colloidal particles that wet both liquids are included in this system, they can adsorb onto the oil-water interface during the demixing process. The energy cost of removing these particles from the interface is typically extremely large and can exceed thermal energy by several orders of magnitude depending on the size of the particles, the oil-water, oil-particle and water-particle surface tensions, and the line tension of the three-phase contact line. See, e.g., Binks, B. P. & Horozov, T. S. Colloidal Particles at Liquid Interfaces (Cambridge Univ. Press, 2008); Wi, H. S., Cingarapu, S., Klabunde, K. J. & Law, B.M. Nanoparticle adsorption at liquid-vapor surfaces: influence of nanoparticle thermodynamics, wettability, and line tension, Langmuir 27, 9979-9984 (2011). As the system coarsens, the areal density of the particles increases and, provided the particles are adsorbed irreversibly to the oil-water interface, the particle assembly eventually jams, arresting further coarsening of the system and locking in its structure. See, e.g., Cates, M. E. & Clegg, P. S. Bijels: a new class of soft materials, Soft Matter 4, 2132-2138 (2008); Clegg, P. S. et al. Emulsification of partially miscible liquids using colloidal particles: nonspherical and extended domain structures, Langmuir 23, 5984-5994 (2007). Remarkably, if the surface chemistry of the particles is tuned such that they wet both liquids equally, the particles impose no curvature on the system and an interconnected network of liquid domains known as a 'bijel' (bicontinuous jammed emulsions) is formed. See, e.g., Stratford, K., Adhikari, R., Pagonabarraga, I., Desplat, J.-C. & Cates, M. E. Colloidal jamming at interfaces: a route to fluid-bicontinuous gels, Science 309, 2198-2201 (2005); Herzig, E. M., White, K. A., Schofield, A. B., Poon, W. C. K. & Clegg, P. S. Bicontinuous emulsions stabilized solely by colloidal particles, Nat. Mater. 6, 966-971 (2007); Kralchevsky, P. A., Ivanov, I. B., Ananthapadmanabhan, K. P. & Lips, A. On the thermodynamics of particle-stabilized emulsions: curvature effects and catastrophic phase inversion, Langmuir 21, 50-63 (2005). This requires that a number of rather rigid criteria be fulfilled, meaning that bijels are extremely difficult to produce. See, e.g., Lee, M. N. & Mohraz, A. Bicontinuous macroporous materials from bijel templates, Adv. Mater. 22, 4836-4841 (2010); Tavacoli, J. W., Thijssen, J. H. J., Schofield, A. B. & Clegg, P. S. Novel, robust, and versatile bijels of nitromethane, ethanediol, and colloidal silica: capsules, subten-micrometer domains, and mechanical properties, Adv. Funct. Mater. 21, 2020-2027 (2011); Jansen, F. & Harting, J. From bijels to Pickering emulsions: a lattice Boltzmann study, Phys. Rev. E 83, 1-11 (2011). Furthermore, the lower bound of the resultant domain size is typically rather large (~5 µm), limiting their potential for energy storage and catalysis applications.

Reducing particle size to the nanoscale regime is a promising solution to many of these limitations. Owing to their smaller size and hence greater diffusion coefficient, nanoparticles are known to adsorb onto liquid-liquid interfaces more rapidly below a critical size of ~5 µm. See, e.g., Binks, B. P. & Horozov, T. S. Colloidal Particles at Liquid Interfaces (Cambridge Univ. Press, 2008); Forth, J. & Clegg, P. S. Using a molecular stopwatch to study particle uptake in Pickering emulsions, Langmuir 32, 6387-6397 (2016). Furthermore, a nanoparticle dispersion will stabilize a greater surface area at a given volume fraction, as there will be greater particle cross-sectional area per unit volume. However, ensuring uptake and irreversible binding of nanoparticles to the oil-water interface has proven to be difficult, as has producing the promised reduction in domain size. See, e.g., Reeves, M., Brown, A. T., Schofield, A. B., Cates, M. E. & Thijssen, J. H. J. Particle-size effects in the formation of bicontinuous Pickering emulsions, Phys. Rev. E 92, 032308 (2015).

BRIEF SUMMARY

One embodiment is a method for preparing a stabilized assembly comprising combining a first liquid phase and a second liquid phase, wherein the first phase and the second phase are immiscible, the first phase comprises nanoparticles, the second phase comprises a first end-functionalized polymer having a first molecular weight and a second end-functionalized polymer having a second molecular weight, wherein the first and second end-functionalized polymers can be the same or different, and wherein the second molecular weight is greater than the first molecular weight, and the first and second end-functionalized polymers and the nanoparticles can interact at an interface through ligand interactions to form nanoparticle surfactants; applying a shearing external deformation field to create a new interface between the first liquid phase and the second liquid phase, wherein the nanoparticle surfactants form a disordered, jammed assembly at the new interface; and releasing the shearing external deformation field; wherein upon releasing the external deformation field the jammed assembly at the new interface traps the first liquid phase and the second liquid phase in a deformed state comprising the first liquid phase and the second liquid phase as interpenetrating domains.

Another embodiment is a liquid bicontinuous stabilized assembly comprising a first continuous liquid phase and a second continuous liquid phase, wherein the second liquid phase is immiscible with the first phase; and nanoparticle surfactants assembled at a continuous interface of the first and second continuous liquid phases; wherein the nanoparticle surfactants comprise nanoparticles, a first end-functionalized polymer, and a second end-functionalized polymer, wherein the nanoparticles can interact with the first and second end-functionalized polymers through ligand interactions; wherein the liquid bicontinuous stabilized assembly is stabilized by a disordered, jammed layer of the nanoparticle surfactants at the continuous interface of the first and second continuous liquid phases; and wherein the first and second continuous liquid phases are present as interpenetrating domains.

These and other embodiments are described in detail below.

DETAILED DESCRIPTION

Figure 1:
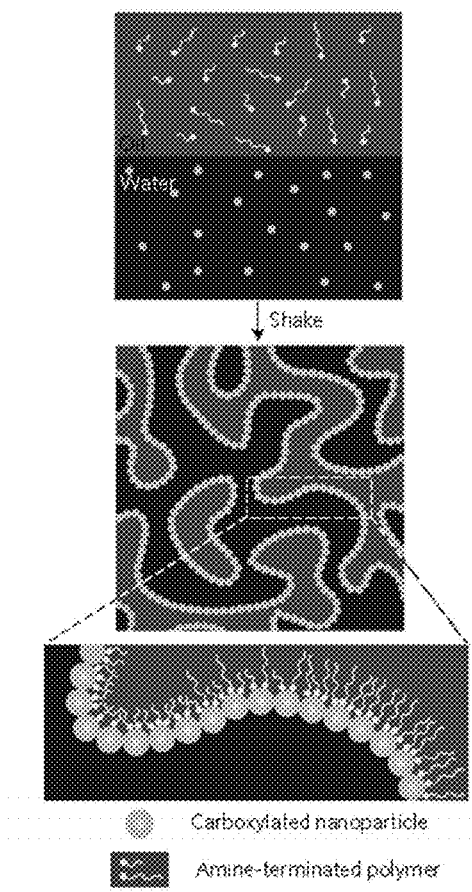
FIG. 1 is a schematic illustration showing the formation of bijels by the jamming of nanoparticle surfactants at the oil-water interface.

Bicontinuous jammed emulsions (or bijels) are tortuous, interconnected structures of two immiscible liquids, kinetically trapped by colloidal particles that are irreversibly bound to the oil-water interface. See, e.g., Stratford, K., Adhikari, R., Pagonabarraga, I., Desplat, J.-C. & Cates, M. E. Colloidal jamming at interfaces: a route to fluid-bicontinuous gels. Science 309, 2198-2201 (2005); Herzig, E. M., White, K. A., Schofield, A. B., Poon, W. C. K. & Clegg, P. S. Bicontinuous emulsions stabilized solely by colloidal particles. Nat. Mater. 6, 966-971 (2007). A wealth of applications have been proposed for bijels in catalysis, energy storage and molecular encapsulation (see, e.g., Cates, M. E. & Clegg, P. S. Bijels: a new class of soft materials. Soft Matter 4, 2132-2138 (2008); Lee, M. N. & Mohraz, A. Bicontinuous macroporous materials from bijel templates. Adv. Mater. 22, 4836-4841 (2010); Tavacoli, J. W., Thijssen, J. H. J., Schofield, A. B. & Clegg, P. S. Novel, robust, and versatile bijels of nitromethane, ethanediol, and colloidal silica: capsules, subten-micrometer domains, and mechanical properties. Adv. Funct. Mater. 21, 2020-2027 (2011)), but large domain sizes (on the order of 5 μm or larger) and difficulty in fabrication pose major barriers to their use. See, e.g., Lee, M. N., Thijssen, J. H. J., Witt, J. A., Clegg, P. S. & Mohraz, A. Making a robust interfacial scaffold: bijel rheology and its link to processability. Adv. Funct. Mater. 23, 417-423 (2013); Haase, M. F., Stebe, K. J. & Lee, D. Continuous fabrication of hierarchical and asymmetric bijel microparticles, fibers, and membranes by solvent transfer induced phase separation (STRIPS). Adv. Mater. 27, 7065-7071 (2015); Rumble, K. A., Thijssen, J. H. J., Schofield, A. B. & Clegg, P. S. Compressing a spinodal surface at fixed area: bijels in a centrifuge, Soft Matter 12, 4375-4383 (2016). The present inventors have discovered that bijels with sub-micrometer domains can be formed via homogenization, rather than spinodal decomposition. This has been achieved this using nanoparticle surfactants: polymers and nanoparticles of complementary functionality (for example, ion pairing) that bind to one another at the oil-water interface. See, e.g., Cui, M., Emrick, T. & Russell, T. P. Stabilizing liquid drops in nonequilibrium shapes by the interfacial jamming of nanoparticles. Science 342, 460-463 (2013); Huang, C. et al. Structured liquids with pH-triggered reconfigurability, Adv. Mater. 28, 6612-6618 (2016). This allows the stabilization of the bijel far from the demixing point of the liquids, with interfacial tensions on the order of 20 mN m$^{-1}$. Furthermore, the present strategy is extremely versatile, as solvent, nanoparticle and ligand can all be varied.

Accordingly, liquid bicontinuous stabilized assemblies represent one aspect of the present disclosure. The liquid bicontinuous stabilized assemblies comprise nanoparticle surfactants at the interface of a first and a second liquid phase. The first and second phases are continuous phases, and the continuous liquid phases form interpenetrating domains. Thus, the interface at which the nanoparticles surfactants are assembled is a continuous interface between the two phases. The liquid bicontinuous stabilized assemblies comprising interpenetrating domains comprising the first and second phases can comprise a plurality of channels, wherein each channel can have a channel width of 10 micrometers or less.

Each of the phases can be a liquid, and can further be any number of liquids provided that the liquids are immiscible. For example, the first and second phases can be aqueous and non-aqueous. A non-aqueous phase can be an organic phase. The organic phase can include, for example, organic solvents (e.g., toluene, ethyl acetate, methylene chloride, chloroform, carbon tetrachloride, dichloroethane, methyl ethyl ketone, decane, and the like), oils (e.g., silicone oil, mineral oil, vegetable oils, and the like), hydrocarbons, fluorocarbons, waxes, and molten polymers. The organic phase can include materials which are solid at room temperature, provided that the system temperature can be adjusted such that the materials become liquid (i.e., in their molten form). In one embodiment, the first phase can be water, and the second phase can be an organic phase. In some embodiments, the organic phase comprises toluene, decane, silicone oil, and the like, or a combination thereof.

The amount of the dispersed phase can dictate the size and/or shape of the resulting assembly. Thus, the amount of the first and second phases can be selected according to the desired size and/or shape of the stabilized assembly. For example, the first and second liquid phases can be present in volume ratio of 25:75 to 75:25, or 40:60 to 60:40, or 45:55 to 55:45. In a specific embodiments, the first and second liquid phases can be present in volume ratio of about 50:50.

The nanoparticle surfactants can be generated in situ. For example, nanoparticles, generally particles having one or more dimensions on the order of 100 nanometers (nm) or less, that are dispersed in an aqueous phase which is further combined with a non-aqueous phase (an oil) do not self-assemble at the interface between the aqueous and non-aqueous phases to reduce the interfacial energy, and therefore do not form a monolayer of nanoparticles at the oil-water interface that arrange or pack in a liquid-like manner. The decrease in the interfacial energy per nanoparticle that is necessary to form a monolayer of nanoparticles at the interface can be enhanced by dissolving an end-functionalized polymer in the non-aqueous phase that can interact with the nanoparticles in the aqueous phase, thereby preferably forming nanoparticle surfactants.

The nanoparticles can be metal, metal oxide, dielectric, semiconductor, inorganic, organic, hybrid structures and the like. For example, the nanoparticles can comprise an organic polymer, for example, polystyrene. In some embodiments, the nanoparticles can comprise inorganic nanoparticles, for example, silica. The nanoparticles can be functionalized, for example, the nanoparticles can comprise one or more functional groups present on the surface of the nanoparticle. Exemplary functional groups can include carboxylate, amine, thiol, alcohol, and the like. For example, the nanoparticles can be carboxylated polystyrene nanoparticles. In some embodiments, the nanoparticles can comprise carboxylated silica particles. When the nanoparticle is, for example, a metal nanoparticle, the nanoparticle need not be functionalized as the interaction of various metals with specific functional groups is generally known. For example, a gold nanoparticle can interact with a thiol-functionalized polymer.

The nanoparticles can have one or more dimensions on the order of 100 nanometers (nm) or less. For example, the nanoparticles can have a diameter of 100 nm or less, specifically, 1 to 100 nm, more specifically, 5 to 50 nm, even more specifically, 5 to 25 nm.

The nanoparticles can be dispersed in the first liquid phase, and there is no particular limitation on the amount of nanoparticles present in the first phase. In some embodiments, the nanoparticles can be present in an amount of at least 0.1 weight percent, for example 0.1 to 20 weight percent, for example 0.1 to 10 weight percent, for example 0.5 to 5 weight percent, based on the weight of the first liquid phase. In a specific embodiment, the concentration of nanoparticles in the first phase can be at least 0.1 weight percent.

The end-functionalized polymer can be selected based on polymer solubility in the desired phase. For example, an oil-soluble polymer can be selected when it is preferable that the polymer is soluble in an oil phase. Conversely, a water-soluble polymer can be selected when it is preferable that the polymer is soluble in a water phase. The end-functionalized polymer can comprise a polymer having at least one functionalized chain end. For example, an end-functionalized polymer can include a mono-functionalized polymer, a di-functionalized polymer, or a multi-functionalized polymer, depending on the number of chain ends available for functionalization. The term "multi-functionalized polymer" is meant to include polymers having more than two functionalized chain ends.

The chemical structure of the end-functionalization can be selected based on the specific ligand interactions and strength of those interactions with the selected nanoparticle. The scope of such selected polymers and their end-functionalized chemical structure is not limited in this regard by the present disclosure. The ligand interaction can be any suitable bonding or non-bonding interaction. Ligand interactions comprise high affinity or low affinity site-specific type interactions, non-bonded electrostatic interactions such as electropositive or electronegative type or van der Waals repulsive and attractive forces, ionic bonds, hydrogen bonds, coordination bonds, or a combination thereof.

The polymer end-functionalization can include, for example, amine, thiol, alcohol, carboxylate, and the like. For example, the end-functionalized polymer can be an amine-functionalized polymer. In an exemplary embodiment, the end-functionalized polymer can be an amine-functionalized polydimethylsiloxane, a bis(amine)-functionalized polydimethylsiloxane, or a combination comprising at least one of the foregoing. In another embodiment, the end-functionalized polymer can be an amine-functionalized polystyrene.

The present inventors have unexpectedly discovered that it can be advantageous to provide liquid bicontinuous stabilized assemblies prepared from nanoparticle surfactants, wherein the nanoparticle surfactants comprise the above-described nanoparticles and two end-functionalized polymers (i.e., a first end-functionalized polymer, and a second end-functionalized polymer). The first and second end-functionalized polymers can be the same or different (in terms of chemical composition). In some embodiments, the first and second end-functionalized polymers are the same (i.e., they each are derived from repeating units of the same chemical structure). Preferably, the first end-functionalized polymer has a first molecular weight and the second end-functionalized polymer has a second molecular weight, wherein the second molecular weight is greater than the first molecular weight. Each of the first and second end-functionalized polymers can have a number average molecular weight ($M_n$) of 1,000 to 100,000 Daltons (Da), for example 1,000 to 20,000 Da, for example 1,000 to 10,000 Da, provided that the second molecular weight is greater than the first molecular weight. In a specific embodiment, the first molecular weight is 500 to 1,500 grams per mole and the second molecular weight is 2,000 to 4,000 grams per mole. The first end-functionalized polymer and the second end-functionalized polymer can be present in a molar ratio of 0.1:1 to 1:0.1, or 0.25:1 to 1:0.25, or 0.5:1 to 1:0.5, or 0.9:1 to 1:0.9. Ina specific embodiment, the first end-functionalized polymer and the second end-functionalized polymer can be present in an equimolar ratio (i.e., about 1:1).

There is no particular limitation on the total amount of polymer that can be present (i.e., the total amount of the first end-functionalized polymer and the second end-functionalized polymer), with the proviso that the phase in which it is dissolved remains fluid. For example, the polymer can be present in an amount of 0.05 to 20 weight percent, or 0.1 to 20 weight percent, or 1 to 20 weight percent, or 0.05 to 10 weight percent, or 0.1 to 10 weight percent, or 1 to 10 weight percent, based on the total weight of the polymer and the second liquid phase in which the polymer is dissolved.

Depending on the ligand interaction employed in preparing the nanoparticle surfactants, the interaction can be influenced by external stimuli including, for example, pH, temperature, electric fields, magnetic fields, and shear forces. For example, carboxylated nanoparticles and amine-functionalized polymers can form nanoparticle surfactants through ammonium-carboxylate interactions, the strength of which can be influenced by system pH. For example, at a pH of 5 to 7, specifically, 5.5 to 6.5, more specifically 6, the nanoparticle surfactant remains stable. At a pH of 1 to 3, specifically 1.5 to 2.5, more specifically 2, the nanoparticle surfactant can be decomposed into the respective carboxylated nanoparticle and amine-functionalized polymer.

The above-described system is not limited to nanoparticles that are dispersed in an aqueous phase, therefore the nanoparticles can alternatively be dispersed in a non-aqueous phase and the end-functionalized polymer can be dissolved in an aqueous phase.

Nanoparticle surfactants can form when a first liquid containing nanoparticles is combined with a second liquid with which it is immiscible containing an end-functionalized polymer that can interact with the nanoparticles by way of ligand interactions. Accordingly, the nanoparticle surfactants can reduce the interfacial energy. Further the nanoparticle surfactants can form so as to saturate the interface of the first liquid phase and the second liquid phase, and maximize the resultant reduction in interfacial energy, in which case the nanoparticle surfactants at the interface can form a disordered, jammed assembly. Interfacial particle "jamming" resulting in the jammed assemblies can refer to increasing the particle density at the interface so that the interface becomes rigid. Thus, the rigid interface can freeze-in a particular shape in an otherwise liquid system.

The combination of the first liquid phase and the second liquid phase can be subjected to a deformation field to provide a bicontinuous stabilized assembly. For example, by applying an external deformation field to the liquid medium, the phases can be deformed and the interfacial area (surface area) can be increased to represent a new interface, thereby causing the nanoparticle surfactant assembly at the new interface to unjam. More nanoparticle surfactants can assemble at the new interface so as to saturate the new interface and maximize the reduction in interfacial energy. The nanoparticle surfactants can assemble so as to saturate the said new interface and again form a disordered, jammed assembly of the nanoparticle surfactants at the said new interface.

The external deformation field can be a variety of means of deformation including, for example, mechanical means such as compressive and/or shear deformation fields, electrical deformation fields, magnetic deformation fields, ultrasonic deformation fields, or any combination thereof that can suitably alter the morphology of the assembly. For example, the external deformation field can be a shearing field. In some embodiments, a shear deformation field can be applied, for example, by vortexing. Suitably altering the morphology of the assembly refers to providing an assembly having a non-equilibrium shape (i.e., an arbitrary shape). Preferably, applying the deformation field can result in a bicontinuous liquid stabilized assembly (i.e., the new interface that forms during deformation can be a continuous interface), wherein the first and second liquid phases are continuous liquid phases that form interpenetrating domains within the assembly.

Upon releasing the external deformation field, the bicontinuous assembly having an assembly of nanoparticle surfactants at the continuous interface attempts to relax from its deformed state so as to decrease the surface area, returning to its lowest energy state to minimize the interfacial area. Releasing the external deformation field occurs subsequent to the assembly of the jammed layer of nanoparticle surfactants at the new interface, and the presence of the jammed layer at the new interface can arrest further change in the shape of the assembly thereby kinetically trapping the system in the form of the liquid bicontinuous stabilized assembly. This is shown schematically in FIG. 1. Stated another way, the system can be kinetically trapped in a deformed state by the jammed layer of nanoparticle surfactants at the new continuous interface.

The liquid bicontinuous stabilized assembly can be controlled and/or influenced by various factors including, for example, the magnitude and direction of the applied external deformation field, type of applied external field(s), length of time that the external field is applied, time period for assembly of the nanoparticle surfactants at the new interface under the applied external deformation field, viscosity of the fluids, number of cycles for application and/or release of the external deformation field(s), type of nanoparticles, concentration of nanoparticles, conductivity of the fluids, dielectric permittivity of the fluids, selected end-functionalized polymer and its degree of polymerization, strength and type of the ligand interaction between the end-functionalized polymer and the nanoparticles, and combinations thereof. The extent of the assembly of the nanoparticle surfactants at the new interface, which is created by the deformation field, can be in between a fully jammed layer of nanoparticle surfactants at the new interface and a partially jammed layer of nanoparticles at the new interface.

In a specific embodiment, the stabilized assembly comprises a first continuous liquid phase comprising water and a second continuous liquid phase comprising an organic phase, and nanoparticle surfactants comprising carboxylated polystyrene assembled at a continuous interface of the first and second continuous liquid phases. The first and second end-functionalized polymer each comprise amine-functionalized polydimethylsiloxane, wherein the first molecular weight is 750 to 1,500 grams per mole; and the second molecular weight is 2,500 to 3,500 grams per mole.

In another specific embodiment, the stabilized assembly comprises a first continuous liquid phase comprising water and a second continuous liquid phase comprising an organic phase, and nanoparticle surfactants comprising carboxylated silica assembled at a continuous interface of the first and second continuous liquid phases. The first and second end-functionalized polymer each comprise amine-functionalized polystyrene, wherein the first molecular weight is 750 to 1,500 grams per mole; and the second molecular weight is 2,500 to 3,500 grams per mole.

Another aspect of the present disclosure is a method of making a stabilized assembly. The method comprises combining a first liquid phase and a second liquid phase, wherein the first phase and the second phase are immiscible, and wherein the first phase comprises nanoparticles; and the second phase comprises a first end-functionalized polymer having a first molecular weight, and a second end-functionalized polymer having a second molecular weight; applying a shearing external deformation field to increase the surface area of the first phase to create a new interface, wherein the nanoparticle surfactants form a disordered, jammed assembly at the new interface; and releasing the shearing external deformation field.

Applying the shear deformation field can be by, for example, vortexing. As described above, preferably the new interface that forms is a continuous interface and the deformed state comprises a liquid bicontinuous system comprising the first phase and the second phase. The liquid bicontinuous system can comprise the first phase and the second phase as interpenetrating domains.

The invention is further illustrated by the following non-limiting examples.

EXAMPLES

Applying the binding of nanoparticles and functional polymers of complementary functionality at the oil-water interface to form elastic nanoparticle surfactant films allows us to stabilize bijels using liquids far from their demixing point (that is, with an interfacial tension on the order of 10-30 mN m$^{-1}$). These interfacial films include hydrophilic, carboxylic acid-functionalized polystyrene (PS-CO$_2$H) nanoparticles dispersed in water and hydrophobic, amine-functionalized polydimethylsiloxane (PDMS-NH$_2$) in oil (for example, toluene). A schematic of the system, showing the locations of the components and the resultant structures they stabilize against coalescence, is presented in FIG. 1. There are many benefits to using such a system. Using colloidal particles alone requires extremely careful modification of the surface chemistry of the particle to achieve neutral wetting conditions. The requirement that the system undergo liquid-liquid phase separation limits the choices of fluids available and makes it challenging to generate large volumes of bicontinuous materials. Until now, nanoparticles (diameter<50 nm) have been of limited use in bijel stabilization owing to their comparatively low binding energies to the oil-water interface, especially at the low surface tensions present in bijels. The binding of the functional polymers to the particle surface increases this binding energy, trapping the nanoparticle surfactants at the interface despite their small size.

Figure 2:
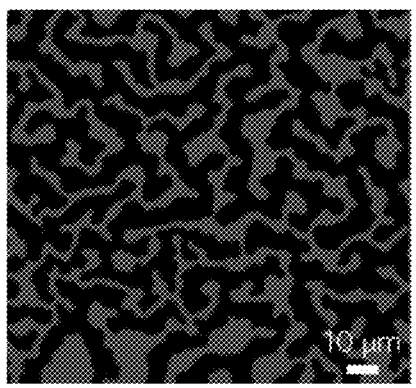
FIG. 2 is a microscope image of a liquid bicontinuous system stabilized by nanoparticle surfactants consisting of an equimolar mixture of 1,000 g mol$^{-1}$ and 3,000 g mol$^{-1}$ PDMS-NH$_2$ (1.61 mmol l$^{-1}$) and nanoparticles (0.5 mg ml$^{-1}$).

A system of two different molecular weights of PDMS-NH$_2$ containing a single amine group (number average molecular weight, Mn=1,000 and 3,000 g mol$^{-1}$) in toluene and 16.5 nm PS-CO$_2$H nanoparticles in water was first studied. When agitated by shaking, equal-volume mixtures of oil and water form emulsions with a characteristic diameter on the micrometer scale. Low-molecular-weight PDMS-NH$_2$ (1,000 g mol$^{-1}$) tends to form either oil-in-water-in-oil double emulsions or water-in-oil emulsions, while high-molecular weight PDMS-NH$_2$ (3,000 g mol$^{-1}$) tends to form water-in-oil emulsions, suggesting that the relative size of the hydrophobic moiety of the functional polymer imposes a curvature upon the system. In both instances droplets are aspherical, demonstrating the interfacial elasticity of the system. It was also found that nanoparticle surfactant formation results in the spontaneous emulsification of toluene in a macroscopic water droplet. If a mixture of high- and low-molecular-weight functional polymers in toluene is used and the system is agitated in a vortex mixer, extended domains of oil and water form, creating a bijel. These regions have a characteristic channel diameter, of 10 µm or less, but extend far beyond the field of view accessible on a single micrograph, suggesting that the system is homogeneous, as shown in FIG. 2.

Figure 3:
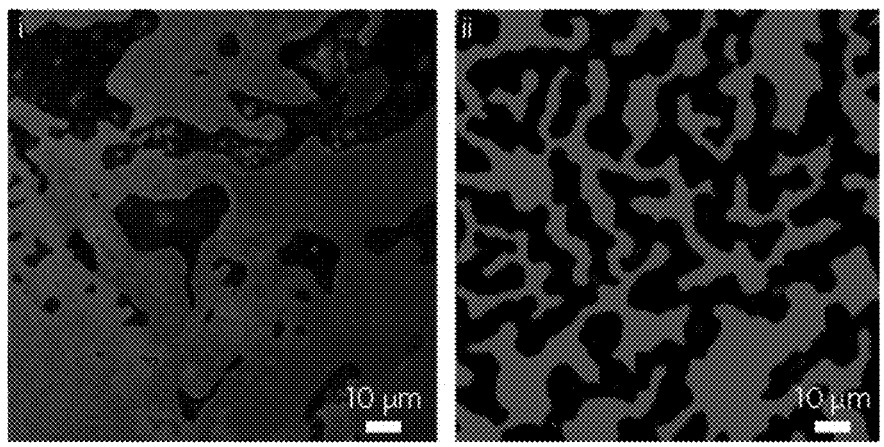
FIG. 3 shows a microscope image of liquid bicontinuous systems formed by nanoparticle surfactants with a nanoparticle concentration of (i) 0.1 and (ii) 0.5 mg ml$^{-1}$ at a fixed concentration of PDMS-NH$_2$ (1.61 mmol l$^{-1}$).
Figure 4:
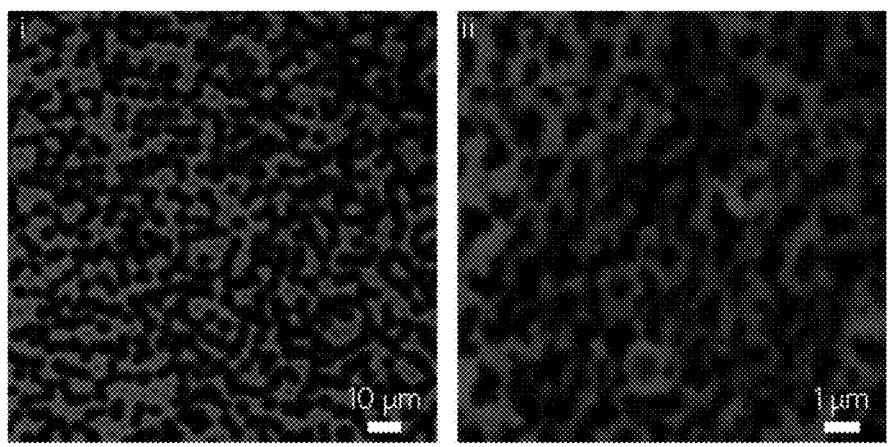
FIG. 4 shows bicontinuous morphologies formed by nanoparticle surfactants at constant particle concentration (1 mg ml$^{-1}$) with varying concentration of PDMS-NH$_2$ from (i) 0.161 to (ii) 16.1 mmol l$^{-1}$.

Insight into the formation mechanism and structure of these bijels is given by studying the parameters that govern their stability, structure and domain size. The particles alone are not interfacially active, and the functional polymers alone do not impart the system with the interfacial elasticity necessary to arrest coalescence. This synergistic stabilization mechanism means that reducing the concentration of either the functional polymers or the particles will increase the domain size of the system. At low particle concentrations of 0.1 mg ml$^{-1}$, the system coalesces extensively. Increasing the particle concentration to 0.5 mg ml$^{-1}$ results in the stabilization of a bijel, as shown in FIG. 3. Varying the functional polymer concentration by two orders of magnitude, from 0.161 to 16.1 mmol l$^{-1}$, has the effect of reducing the domain size by an order of magnitude from 10 to 1 µm, as shown in FIG. 4. The present inventors have also extensively probed the effect of using different mixtures of polymers of different molecular weights. Liquid-bicontinuous systems have been successfully formed using a wide range of molecular weights of functional polymer (Mw=1-10 kg mol$^{-1}$), a range of molar ratios of nanoparticles to polymer, and a broad scope of volumetric ratio between water and oil. Surprisingly, the present inventors have noted that the use of a mixture of molecular weights of polymer, and a sufficiently high concentration of particles is an important consideration.

As discussed above, bijels are generally formed via arrested spinodal decomposition, yielding structures with approximately zero mean curvature; this is achieved by using particles that wet both liquids equally and thus do not impose any curvature upon the system. By contrast, the liquid bicontinuous systems of the present disclosure are produced using high shear rates and therefore during the initial stages of formation will consist of droplets. The bicontinuous structure of the system can be attributed to the coarsening processes that the system undergoes after being sheared—combination of varying local curvature being imposed by the different molecular weights of functional polymer and a limited coalescence process in which the system coarsens until it reaches a critical interfacial density of particles that arrests further coalescence. Increasing the molecular weight of the functional polymer reverses the sign of both principal radii of curvature of the nanoparticle surfactant stabilized emulsions (that is, it causes phase inversion from an oil-in-water to a water-in-oil emulsion). The bicontinuous system described herein, in which mixtures of functional polymer of different Mw are used, clearly shows regions in which the domains have both the same and differing signs of principal radii of curvature, which is attributed to the presence of the different molecular weights of polymers used. Without wishing to be bound by theory, it is believed that the different molecular weights of polymer give rise to different effective contact angles for the particles in the present system, with the larger-molecular-weight polymer giving rise to effectively hydrophobic particles.

Figure 5:
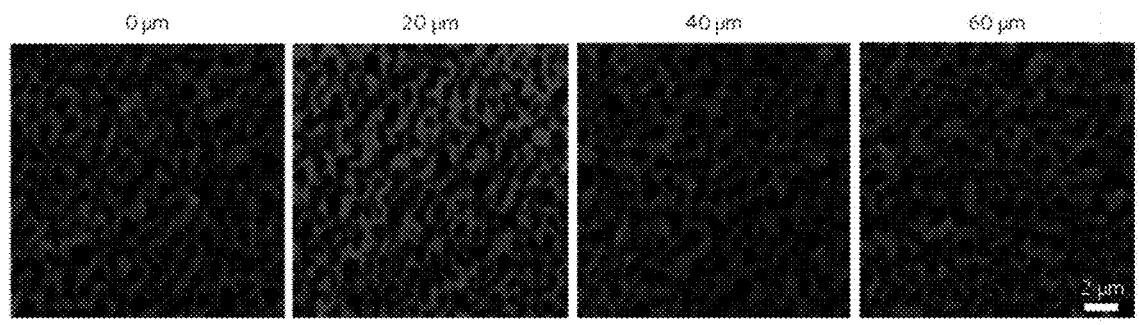
FIG. 5 shows confocal micrographs of a bijel made using high concentrations of particles (10 mg ml$^{-1}$) and PDMS-NH$_2$ (16.1 mmol l$^{-1}$) at increasing (left to right) depths within the sample. Grey, toluene; black, water.

Increasing the concentration of both functional polymers and particles in the system allows us to probe the smallest length scale that can be produced in our liquid bicontinuous systems. In emulsions and bijels, the domain size d (for example, droplet diameter and channel width) scales with emulsifier concentration c as d~c$^{-1}$. Accordingly, using 10 mg ml$^{-1}$ PS-CO$_2$H nanoparticles and 16.1 mmol l$^{-1}$ PDMS-NH$_2$ yields a bijel structure with remarkably small domains. Imaging the system by sampling above the diffraction limit adds no information, but clarifies the image significantly, showing that the channel width in the system is ~500 nm (FIG. 5), roughly twice the diffraction limit of the objective used. This represents a reduction in domain size of over an order of magnitude relative to the current state of the art. Significant further reductions in channel diameter could be achieved by using more energetic homogenization methods (for example, a rotor-stator or ultrasonic probe). If the material is a gel, it cannot flow. When inverted for one week, this fully liquid system remains intact, demonstrating the presence of a yield stress, which is further indicative of the bicontinuous nature of the system.

Figure 6:
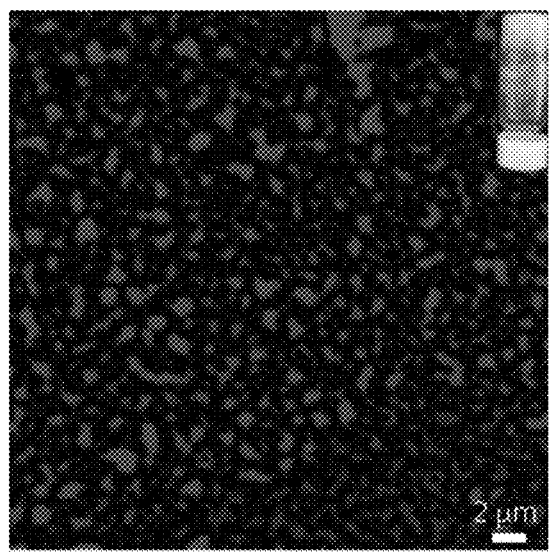
FIG. 6 shows confocal fluorescence images of liquid bicontinuous systems formed by nanoparticle surfactants consisting of silica-CO$_2$H nanoparticles (25 mg ml$^{-1}$, aqueous dispersion) and PDMS-NH$_2$ (Mw=1,000 and 3,000 g mol$^{-1}$, 16.1 mmol l$^{-1}$, in toluene).
Figure 7:
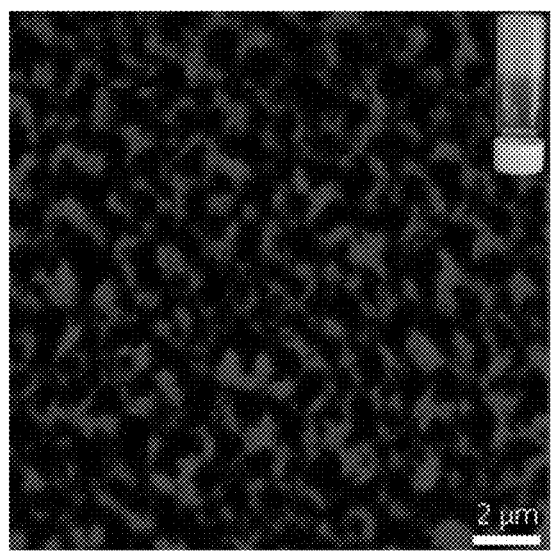
FIG. 7 shows confocal fluorescence images of liquid bicontinuous systems formed by nanoparticle surfactants consisting of PS-CO$_2$H nanoparticles (10 mg ml$^{-1}$, aqueous dispersion) and PS-NH$_2$ (Mw=1,000 and 5,000 g mol$^{-1}$, 16.1 mmol l$^{-1}$, in toluene).
Figure 8:
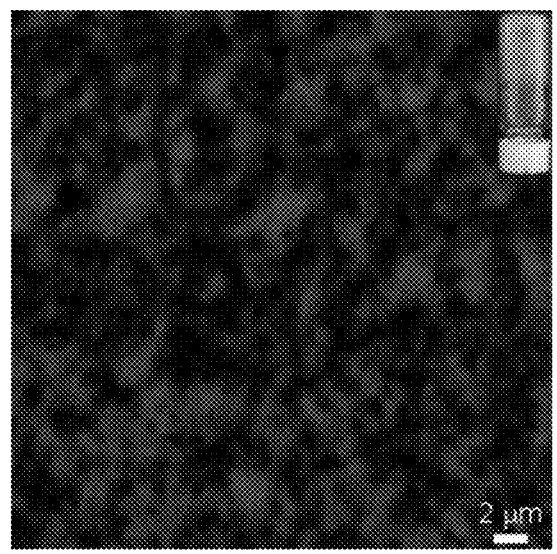
FIG. 8 shows confocal fluorescence images of liquid bicontinuous systems formed by nanoparticle surfactants consisting of PS-CO$_2$H nanoparticles (10 mg ml$^{-1}$, aqueous dispersion) and PDMS-NH$_2$ (Mw=1,000 and 3,000 g mol$^{-1}$, 16.1 mmol l$^{-1}$, in decane).

In comparison with bijels produced via spinodal decomposition, which require the fulfilment of several stringent criteria for successful preparation, we can readily produce bijels structures using a range of chemistries. In particular, the present inventors have demonstrates that, if a mixture of molecular weights of functional polymers is used to synthesize the system, the solvents, particles and functional polymers can all be changed. As such, the present inventors have successfully synthesized bijel structures using silica-$CO_2H$ nanoparticles (FIG. 6), PS-$CO_2H$ nanoparticles and PS-$NH_2$ functional polymer (FIG. 7) and decane as the non-polar phase (FIG. 8).

In conclusion, nanoparticles have been successfully applied to generate bijel structures with sub-micrometer domains, bringing them into the realm of nanotechnology. This is an essential first step in formulating them for specific industrial applications, with homogenization (or stirring, in the case of highly viscous liquids) providing a pathway to scale-up. The present inventors have shown that the benefits are manifold: bijel generation is greatly simplified, more versatile chemistries can be used, and domain size is reduced by over an order of magnitude. These systems have potential in diverse application, such as multiphase microreactors, microfluidic devices, membrane contactors and multiscale porous materials.

Experimental details follow.

Amine terminated polystyrene was prepared according to the following procedure. Disilacyclopentane-protected polystyrene was synthesized via living anionic polymerization, and carried out under high vacuum condition (10-7 Torr) with pre-purged all glass apparatus equipped with breakseals. In a typical synthesis of disilacyclopentane-protected polystyrene, the hexane solution of sec-butyl lithium (0.716 mmol) was introduced into the solution of styrene (3.58 g, 34.39 mmol) in benzene (~40 mL. After 12 h, the hexane solution of diphenylethylene (1.79 mmol, 2.5 eq.) was introduced into the PS lithium anion solution and reacted overnight. Finally, the hexane solution of 1-(3-bromopropyl)-2,2,5,5-tetramethyl-1-aza-2,5-disilacyclopentane in hexane (1.08 mmol, 1.5 eq.) was introduced into the reactor and reacted for 3 d at room temperature. The polymer was then precipitated into large excess of methanol, filtered, and dried under reduced vacuum. White powder product was recovered with 100% yield. The molecular weight ($Mn=5200$ g $mol^{-1}$) and polydispersity (PDI=1.02) were measured by gel permeation chromatography in tetrahydrofuran relative to polystyrene standards. The structure of the polymer was confirmed by proton nuclear magnetic resonance CH NMR) spectroscopy. By varying the ratios between sec-butyl lithium and styrene, disilacyclopentane-protected PS with different molecular weights were prepared.

Amino-polystyrene was prepared by reacting the above protected polymer with THF solution of tetrabutylammonium fluoride (TBAF). In a typical procedure, 3.6 g of disilacyclopentane-protected PS was dissolved in 20 mL of THF followed by adding 2.1 mL THF solution of tetrabutylammonium fluoride (3 eq.). The reaction mixture was allowed to proceed overnight and subsequently concentrated under reduced pressure. The crude product was dissolved in chloroform and precipitated into large excess of methanol for three times, filtered, and dried. Amino-polystyrene was obtained as a white powder (2.7 g, 75% yield). The molecular weight ($Mn=5,000$ g $mol^{-1}$) and polydispersity (PDI=1.02) were confirmed by SEC. The polymer structure and amino end functionality were confirmed by both $^1H$ NMR and MALDI-TOF mass spectrometry. PS-$NH_2$ with molecular weights of 1000 g $mol^{-1}$, 9000 g $mol^{-1}$ and 17000 g $mol^{-1}$ were synthesized with the similar procedure.

The stabilized assemblies were prepared as summarized in the scheme of FIG. 1.

For example, carboxylate-functionalized polystyrene nanoparticles were dispersed in water at a concentration of 10 milligrams per milliliter (1 weight percent). The aqueous dispersion of nanoparticles (1-2 milliliters) was added to 10 milliliters of a mixture of oil consisting of 95 volume percent of a high viscosity silicone oil and 5 volume percent of a low viscosity silicone oil having an amine end-group (an amine-functionalized polydimethylsiloxane (PDMS)). The oil-water mixture was stirred with a stir rod for one hour, then kept for 12 hours at room temperature prior to use. Nanoparticle surfactants formed as a result of the carboxylate-amine interactions between the polystyrene nanoparticles and the PDMS, and were assembled at the oil-water interface, reducing the interfacial energy.

The resulting mixture was subjected to vortex mixing for 5 minutes at a speed of 3200 rpm. The nanoparticle surfactants jammed at the interface, arrested further relaxation, and kinetically trapped the assembly in a non-equilibrium, non-spherical shape, to provide the stabilized assemblies (i.e., bijels) of the present disclosure. The stabilized assemblies were images using confocal microscopy, as discussed above.

The invention includes at least the following embodiments.

Embodiment 1: A method for preparing a stabilized assembly, the method comprising, combining a first liquid phase and a second liquid phase, wherein the first phase and the second phase are immiscible, the first phase comprises nanoparticles, the second phase comprises a first end-functionalized polymer having a first molecular weight and a second end-functionalized polymer having a second molecular weight, wherein the first and second end-functionalized polymers can be the same or different, and wherein the second molecular weight is greater than the first molecular weight, and the first and second end-functionalized polymers and the nanoparticles can interact at an interface through ligand interactions to form nanoparticle surfactants; applying a shearing external deformation field to create a new interface between the first liquid phase and the second liquid phase, wherein the nanoparticle surfactants form a disordered, jammed assembly at the new interface; and releasing the shearing external deformation field; wherein upon releasing the external deformation field the jammed assembly at the new interface traps the first liquid phase and the second liquid phase in a deformed state comprising the first liquid phase and the second liquid phase as interpenetrating domains.

Embodiment 2: The method of embodiment 1, wherein applying the shearing external deformation field is by vortex mixing.

Embodiment 3: The method of embodiment 1 or 2, wherein the first phase comprises water.

Embodiment 4: The method of any one or more of embodiments 1 to 3, wherein the second phase comprises an organic phase.

Embodiment 5: The method of any one or more of embodiments 1 to 4, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

Embodiment 6: The method of any one or more of embodiments 1 to 5, wherein the nanoparticles comprise carboxylated polystyrene, carboxylated-silica nanoparticles, or a combination thereof.

Embodiment 7: The method of any one or more of embodiments 1 to 6, wherein the first and the second end-functionalized polymer each comprise an amine-functionalized polystyrene, an amine-functionalized polydimethylsiloxane, or a combination thereof.

Embodiment 8: The method of any one or more of embodiments 1 to 7, wherein the first molecular weight is 500 to 1,500 grams per mole and the second molecular weight is 2,000 to 4,000 grams per mole.

Embodiment 9: The method of any one or more of embodiments 1 to 8, wherein the deformed state comprises a liquid bicontinuous system comprising the first phase and the second phase, and wherein the new interface is a continuous interface.

Embodiment 10: The method of embodiment 1, wherein the first phase comprises water; the second phase comprises an organic phase; the nanoparticles comprise carboxylated polystyrene; the first and second end-functionalized polymer each comprise amine-functionalized polydimethylsiloxane; the first molecular weight is 750 to 1,500 grams per mole; and the second molecular weight is 2,500 to 3,500 grams per mole.

Embodiment 11: The method of embodiment 1, wherein the first phase comprises water; the second phase comprises an organic phase; the nanoparticles comprise carboxylated silica; the first and second end-functionalized polymer each comprise amine-functionalized polystyrene; the first molecular weight is 750 to 1,500 grams per mole; and the second molecular weight is 2,500 to 3,500 grams per mole.

Embodiment 12: A stabilized assembly prepared by the method of any one or more of embodiments 1 to 11.

Embodiment 13: A liquid bicontinuous stabilized assembly, comprising a first continuous liquid phase and a second continuous liquid phase, wherein the second liquid phase is immiscible with the first phase; and nanoparticle surfactants assembled at a continuous interface of the first and second continuous liquid phases; wherein the nanoparticle surfactants comprise nanoparticles, a first end-functionalized polymer, and a second end-functionalized polymer, wherein the nanoparticles can interact with the first and second end-functionalized polymers through ligand interactions; wherein the liquid bicontinuous stabilized assembly is stabilized by a disordered, jammed layer of the nanoparticle surfactants at the continuous interface of the first and second continuous liquid phases; and wherein the first and second continuous liquid phases are present as interpenetrating domains.

Embodiment 14: The stabilized assembly of embodiment 13, wherein the ligand interactions comprise high affinity or low affinity site-specific interactions, non-bonded electrostatic interactions, ionic bonds, hydrogen bonds, coordination bonds, or a combination thereof.

Embodiment 15: The stabilized assembly of embodiment 13 or 14, wherein the first continuous liquid phase comprises water.

Embodiment 16: The stabilized assembly of any one or more of embodiments 13 to 15, wherein the second continuous liquid phase comprises an organic phase.

Embodiment 17: The stabilized assembly of any one or more of embodiments 13 to 16, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

Embodiment 18: The stabilized assembly of any one or more of embodiments 13 to 17, wherein the nanoparticles comprise carboxylated polystyrene nanoparticles, carboxylated-silica nanoparticles, or a combination thereof.

Embodiment 19: The stabilized assembly of any one or more of embodiments 13 to 18, wherein the first and the second end-functionalized polymer each comprise an amine-functionalized polystyrene, an amine-functionalized polydimethylsiloxane, or a combination thereof.

Embodiment 20: The stabilized assembly of embodiment 13, wherein the first phase comprises water; the second phase comprises an organic phase; the nanoparticles comprise carboxylated polystyrene; the first and second end-functionalized polymer each comprise amine-functionalized polydimethylsiloxane; the first molecular weight is 750 to 1,500 grams per mole; and the second molecular weight is 2,500 to 3,500 grams per mole.

Embodiment 21: The stabilized assembly of embodiment 13, wherein the first phase comprises water; the second phase comprises an organic phase; the nanoparticles comprise carboxylated silica; the first and second end-functionalized polymer each comprise amine-functionalized polystyrene; the first molecular weight is 750 to 1,500 grams per mole; and the second molecular weight is 2,500 to 3,500 grams per mole.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method for preparing a stabilized assembly, the method comprising,
combining a first liquid phase comprising water and a second liquid organic phase, wherein
the first phase and the second phase are immiscible,
the first phase comprises nanoparticles, the second phase comprises a first end-functionalized polymer having a first molecular weight and a second end-functionalized polymer having a second molecular weight, wherein the first and second end-functionalized polymers can be the same or different, and wherein the first molecular weight is 500 to 1,500 grams per mole and the second molecular weight is 2,000 to 4,000 grams per mole, and the first and second end-functionalized polymers and the nanoparticles can interact at an interface through ligand interactions to form nanoparticle surfactants;

applying a shearing external deformation field to create a new interface between the first liquid phase and the second liquid phase, wherein the nanoparticle surfactants form a disordered, jammed assembly at the new interface; and releasing the shearing external deformation field;

wherein upon releasing the external deformation field the jammed assembly at the new interface traps the first liquid phase and the second liquid phase in a deformed state comprising extended interpenetrating domains of the first liquid phase and the second liquid phase as a bijel.

2. The method of claim 1, wherein applying the shearing external deformation field is by vortex mixing.

3. The method of claim 1, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

4. The method of claim 1, wherein the nanoparticles comprise carboxylated polystyrene, carboxylated-silica nanoparticles, or a combination thereof.

5. The method of claim 1, wherein the first and the second end-functionalized polymer each comprise an amine-functionalized polystyrene, an amine-functionalized polydimethylsiloxane, or a combination thereof.

6. The method of claim 1, wherein the new interface is a continuous interface.

7. The method of claim 1, wherein
the nanoparticles comprise carboxylated polystyrene;
the first and second end-functionalized polymer each comprise amine-functionalized polydimethylsiloxane;
the first molecular weight is 750 to 1,500 grams per mole; and
the second molecular weight is 2,500 to 3,500 grams per mole.

8. The method of claim 1, wherein
the nanoparticles comprise carboxylated silica;
the first and second end-functionalized polymer each comprise amine-functionalized polystyrene;
the first molecular weight is 750 to 1,500 grams per mole; and
the second molecular weight is 2,500 to 3,500 grams per mole.

9. A stabilized assembly prepared by the method of claim 1.

10. A liquid bicontinuous stabilized assembly, comprising
a first continuous liquid phase comprising water and a second continuous liquid organic phase, wherein the second liquid phase is immiscible with the first phase; and nanoparticle surfactants assembled at a continuous interface of the first and second continuous liquid phases;

wherein the nanoparticle surfactants comprise nanoparticles, a first end-functionalized polymer having a first molecular weight, and a second end-functionalized polymer having a second molecular weight, wherein the first and second end-functionalized polymers can be the same or different, and wherein the first molecular weight is 500 to 1,500 grams per mole and the second molecular weight is 2,000 to 4,000 grams per mole, and wherein the nanoparticles can interact with the first and second end-functionalized polymers through ligand interactions;

wherein the liquid bicontinuous stabilized assembly is stabilized by a disordered, jammed layer of the nanoparticle surfactants at the continuous interface of the first and second continuous liquid phases; and wherein the liquid bicontinuous stabilized assembly comprises extended interpenetrating domains of the first continuous liquid phase and the second continuous liquid phase as a bijel.

11. The stabilized assembly of claim 10, wherein the ligand interactions comprise high affinity or low affinity site-specific interactions, non-bonded electrostatic interactions, ionic bonds, hydrogen bonds, coordination bonds, or a combination thereof.

12. The stabilized assembly of claim 10, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

13. The stabilized assembly of claim 10, wherein the nanoparticles comprise carboxylated polystyrene nanoparticles, carboxylated-silica nanoparticles, or a combination thereof.

14. The stabilized assembly of claim 10, wherein the first and the second end-functionalized polymer each comprise an amine-functionalized polystyrene, an amine-functionalized polydimethylsiloxane, or a combination thereof.

15. The stabilized assembly of claim 10, wherein
the nanoparticles comprise carboxylated polystyrene;
the first and second end-functionalized polymer each comprise amine-functionalized polydimethylsiloxane;
the first molecular weight is 750 to 1,500 grams per mole; and
the second molecular weight is 2,500 to 3,500 grams per mole.

16. The stabilized assembly of claim 10, wherein
the nanoparticles comprise carboxylated silica;
the first and second end-functionalized polymer each comprise amine-functionalized polystyrene;
the first molecular weight is 750 to 1,500 grams per mole; and
the second molecular weight is 2,500 to 3,500 grams per mole.

* * * * *